G. D. POGUE.
METER.
APPLICATION FILED OCT. 29, 1915.

1,249,484.

Patented Dec. 11, 1917.
2 SHEETS—SHEET 1.

Inventor,
George D. Pogue.
By Bakewell & Church attys.

G. D. POGUE.
METER.
APPLICATION FILED OCT. 29, 1915.

1,249,484.

Patented Dec. 11, 1917.
2 SHEETS—SHEET 2.

Inventor,
George D. Pogue.
By Bakewell & Church, Attys.

UNITED STATES PATENT OFFICE.

GEORGE D. POGUE, OF ST. LOUIS, MISSOURI.

METER.

1,249,484. Specification of Letters Patent. Patented Dec. 11, 1917.

Application filed October 29, 1915. Serial No. 58,625.

*To all whom it may concern:*

Be it known that I, GEORGE D. POGUE, a citizen of the United States, residing at St. Louis, Missouri, have invented a certain new and useful Improvement in Meters, of which the following is a full, clear, and exact description, such as will enable others skilled in the art to which it appertains to make and use the same.

This invention relates to meters of the type that are used for measuring air, gas and other fluids.

It is customary to state quantities of compressed air in terms of cubic feet of free air or cubic feet of air at atmospheric pressure. The same rule applies to gas, both natural and manufactured, and contracts for the sale of the latter commodity are usually based on the delivery of a certain number of cubic feet at atmospheric pressure. Where gas is metered at high pressure, for instance, 250 pounds gage, the meter reading is multiplied by 18.+ to determine the atmospheric volume of the gas, and where compressed air is metered it is also necessary to take into account the pressure at which the air is measured, owing to the fact that a cubic foot of air at atmospheric pressure occupies approximately 7.8 times as much space as a cubic foot of air at 100 gage pressure.

The meters that are generally used for determining quantities of air, gas and other fluids are designed to give a record of the total quantity passed without regard to the time required for passage, and if it is desired to determine, at any moment, the rate of flow, for instance, in terms of cubic feet per minute, it is, of course, necessary to take the time element into account. This introduces several disadvantages, as the results are dependent upon the time piece used, the personal accuracy of the observer and the accuracy of the computations made after the readings were secured. Furthermore, considerable time is required to make the necessary observations and computations.

The main object of my invention is to provide a meter or metering apparatus of novel construction for indicating directly the rate of flow of air, gas or any other fluid.

Another object is to provide a meter of the character referred to that will also indicate the gage pressure of the medium being metered.

And still another object is to provide a flow rate meter which is so constructed that it is not necessary for the observer to make allowance for the gage pressure of the medium being metered in determining the rate of flow of said medium in terms of a certain volume at atmospheric pressure. Other objects and desirable features of my invention will be hereinafter pointed out.

Briefly described, my invention consists in a meter provided with a movable member whose position is governed by the velocity of the medium being metered, and means coöperating with said member for denoting the rate of flow of the medium. Said means preferably consists of a visual indicator or indicating means which is so designed that it will show the cubic feet of free air per minute that passes through the meter. In one form of my invention the indicating means consists merely of a stationary element, such, for example, as a dial or graduated scale, and a coöperating movable element, such, for example, as a pointer, whose position on said dial is governed by the velocity-actuated member of the meter. In another form of my invention, however, the dial or graduated scale moves automatically with relation to the pointer, as the pressure of the medium being metered varies, so as to make allowance or compensate for variations in the pressure of the medium, thus overcoming the necessity for the observer to make an allowance for the gage pressure in determining the rate of flow of the medium.

Figure 1 of the drawings is a front elevational view, partly in vertical section, of a meter constructed in accordance with my invention.

Figure 1:
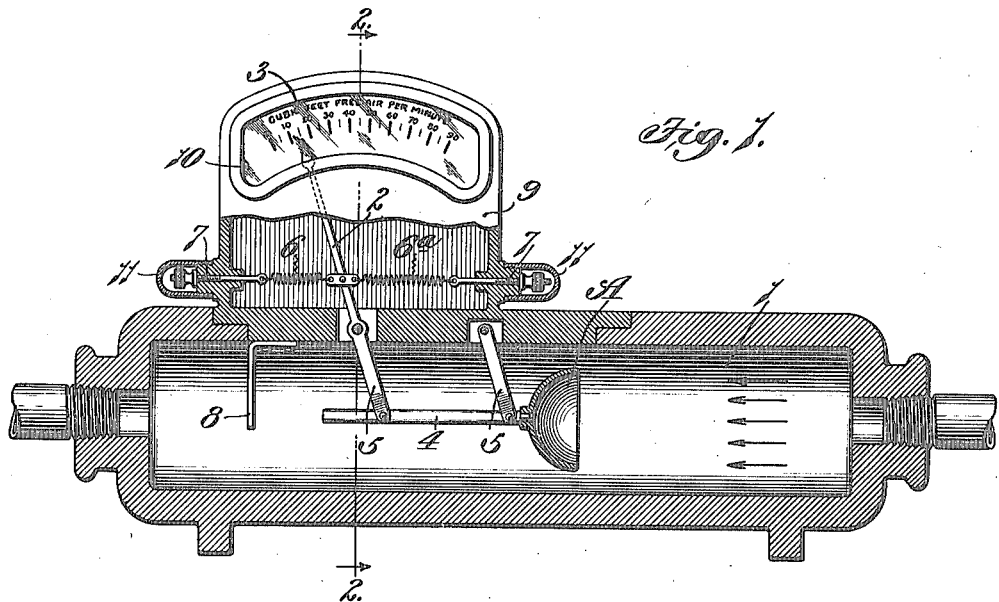
Figure 2:
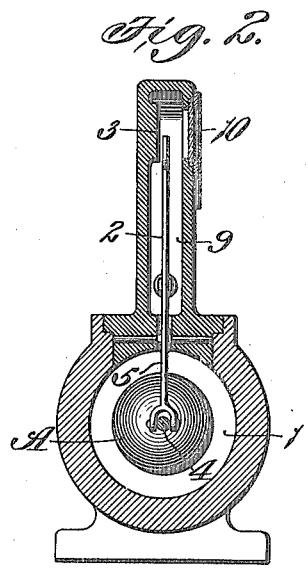
Fig. 2 is a vertical cross-sectional view taken on the line 2—2 of Fig. 1.

Referring to Fig. 1 of the drawings, which illustrates one form of my invention, A designates a member whose position is governed by the velocity of the medium being metered, said member being arranged inside of a chamber or passageway 1 through which the medium being metered flows in the direction indicated by the arrows in Fig.

1. The member A is combined with an indicating means that comprises a movable element whose position changes automatically whenever the member A moves, so as to indicate the rate of flow of the medium traveling through the chamber or passageway 1. In the form of my invention illustrated in Fig. 1 said movable element consists of a pointer or indicator 2 that travels over a stationary dial or graduated scale 3, marked with numerals or other suitable indicia, so as to express in direct terms the rate of flow of the medium, the dial of the meter shown in Fig. 1 being marked to indicate the cubic feet of free air per minute that passes through the meter.

The member A is of less dimensions than the cross-sectional area of the interior of the passageway 1 in which said member is arranged, so that it will not be influenced by the pressure of the medium in said passageway, and while the shape of said member is immaterial so far as my broad idea is concerned, I prefer to make it substantially bell-shaped, or hemispherical-shaped, as shown in Fig. 1, so as to insure movement of same when the medium being metered travels through the passageway 1. One convenient way of mounting the member A is to connect it to a rod 4 that is supported or suspended by means of swinging links 5, as shown in Fig. 1, one of said links being formed by an extension on the lower end of the indicator 2. Any suitable means may be employed for holding the indicator 2 at zero on the dial 3 when no air, gas or other fluid is traveling through the passageway 1, and for restoring said indicator to zero after the flow of the medium through said passageway has ceased. The means that I have herein illustrated for accomplishing this consists of two coiled springs 6 and 6ª arranged on opposite sides of the indicator 2 and connected to adjusting devices 7 that can be manipulated so as to vary the tension of said springs, and thus accurately regulate the indicator 2. A stop 8 that is arranged in the passageway 1 forms an abutment against which the end of the rod 4 strikes when the indicator 2 stands at the highest numeral or graduation on the dial 3. In a meter of the character shown in Fig. 1, namely, one which is designed to indicate the rate of flow of a medium traveling through a conduit or passageway, it is preferable to arrange the indicator 2 in a housing 9 that is air-tight and in communication with the passageway 1, so as to overcome the necessity of using a packed joint for the indicator 2 or the connection between said indicator and the member A. I wish it to be understood, however, that my invention is not limited to a meter of the construction above described, for said meter illustrates only one form of my invention.

The housing 9 of the meter shown in Fig. 1 is provided in one of its side walls with a sight opening covered with a piece of glass or other transparent material 10, so as to expose the dial 3 to view, and the links 5 and stop 8 are carried by the base portion of said housing so as to reduce the cost of manufacture and installation of the meter. The nuts or adjustable portions of the devices 7 that regulate the tension of the springs 6 and 6ª are arranged on the outside of the housing 9 and are normally incased by removable caps 11 so as to prevent the medium being metered from leaking through the openings in said housing through which the devices 7 pass.

Figure 3:
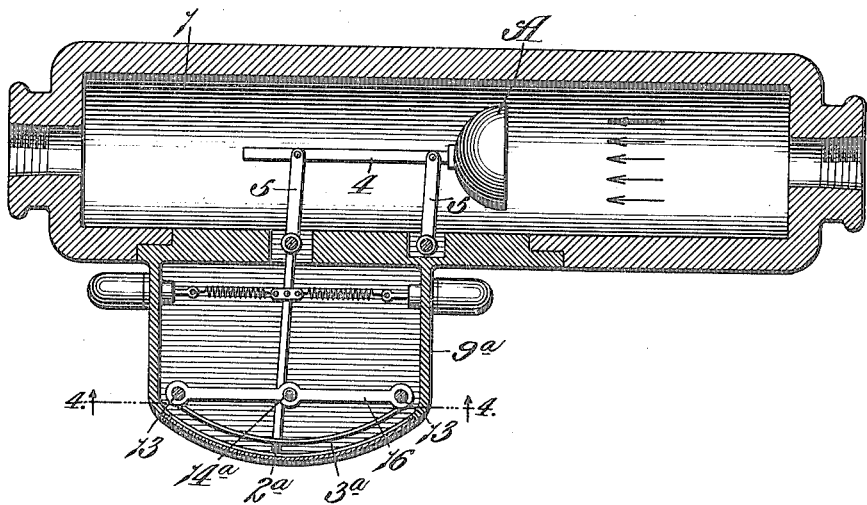
Fig. 3 is a horizontal, longitudinal sectional view, illustrating another form of my invention.
Figure 4:
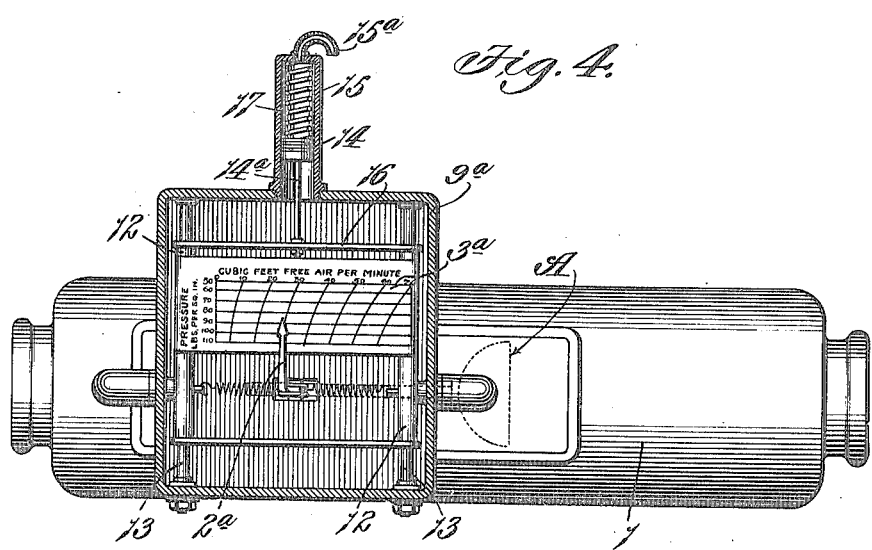
Fig. 4 is a side elevational view of the meter illustrated in Fig. 3, showing a portion of same in vertical section, taken on the line 4—4 of Fig. 3.

The meter illustrated in Figs. 3 and 4 is similar to the meter shown in Fig. 1, but it is so constructed that the observer does not have to make any allowance for the gage pressure of the medium being metered in determining the rate of flow of said medium. It comprises a movable member A whose position is governed by the velocity of the medium that travels through the chamber or passageway 1, an indicator 2ª controlled by said member A and a dial 3ª coöperating with said indicator and combined with a means that causes said dial to move relatively to said indicator when the pressure of the medium being metered varies. The dial 3ª is arranged in a plane at approximately right angles to the plane in which the swinging links 5 move and the indicator 2ª is provided at its outer end with an upwardly bent portion, as shown in Fig. 4, that travels over the dial 3ª. The dial 3ª is carried by sleeves 12 that are slidingly mounted on guide rods 13 arranged in a housing 9ª that projects laterally from one side of the passageway 1, and said dial is provided with an independent set of graduations, preferably numerals, that denote the pressure per square inch of the medium. As shown in Fig. 4, the dial 3ª is provided with a plurality of horizontally ruled lines and with the numbers 50, 60, 70, 80, 90, 100 and 110 which are arranged at one end of the dial opposite said horizontal lines. Said dial is also provided with a vertical line and with a plurality of curved lines that cross the horizontal lines previously mentioned, the numeral 0 being arranged at the upper end of the dial over said vertical line and the numbers 10, 20, 30, 40, 50, 60 and 70 being arranged at the upper end of the dial over the curved lines that cross the horizontal lines, the dial being marked with suitable words to show that the numbers in the vertical column at the left hand end of same indicate the pressure per square inch and that the horizontal row of numbers at the upper end of the dial indicates cubic feet of free air per minute. It will, of course, be understood that the dial or scale of the indicating means could be marked in various other ways. Therefore, I do not wish it to be understood that my invention is limited to a meter provided with an indicating means of the character described for indicating the pressure and the rate of flow of the medium being metered. The position of the dial $3^a$ is governed by a pressure-controlled device consisting of a piston 14 arranged in a cylinder 15 mounted on the upper end of the housing $9^a$, the rod $14^a$ of said piston being connected to a cross member 16 secured to the sleeves 12 and a spring 17 being arranged inside of the cylinder 15, so as to coöperate with said piston to hold the dial $3^a$ in its extreme lower position when no pressure exists in the chamber or passageway 1, the cylinder 15 being provided at its upper end with an orifice $15^a$, as shown in Fig. 4, so as to permit the piston in said cylinder to move freely. When no pressure exists in the chamber 1, and when no air, gas or other fluid is traveling through said chamber, the arrow head on the indicator $2^a$ will stand at zero and in alinement with the topmost horizontal line on the indicator $3^a$. When the medium being metered travels through the passageway 1 the member A will move to the left more or less, according to the velocity of said medium, and the dial $3^a$ will move upwardly more or less, according to the pressure of said medium. If the pressure of the medium is 90 pounds per square inch the dial $3^a$ will move upwardly far enough to bring the horizontal line on the dial, marked 90, into alinement with the arrow-head on the indicator $2^a$, and if the rate of flow of the medium is 10 cubic feet of free air per minute, the arrow-head on the indicator will stand at the curved cross line marked 10, thus indicating that the pressure of the medium is 90 pounds per square inch and that it is traveling through the passageway 1 at the rate of 10 cubic feet of free air per minute. It will thus be seen that the meter illustrated in Fig. 4 not only shows the rate of flow per minute and the pressure per square inch, but it also overcomes the necessity of the observer making allowance for the gage pressure in determining the rate of flow, owing to the fact that any variation in the pressure of the medium causes the dial $3^a$ to move automatically with relation to its coöperating indicator $2^a$, said dial being so marked that it automatically compensates for slight variations in the position of the indicator $2^a$, due to variation in the pressure of the medium.

A meter or metering apparatus of the construction above described will indicate directly the rate of flow of air, gas or any other fluid; it comprises a single dial which shows the gage pressure of the medium, as well as the rate of flow of the medium; and it overcomes the necessity of the observer making computations to determine the rate of flow when the medium is metered at a high pressure. The apparatus can be constructed in various ways, and while I have herein illustrated two different ways of carrying my invention into effect, I do not wish it to be understood that my invention is limited to an apparatus of the particular construction herein disclosed.

Having thus described my invention, what I claim and desire to secure by Letters Patent, is:

1. A meter for the purpose described, comprising a chamber or passageway through which the medium to be metered travels, a movable member in said passageway whose position is governed by the velocity of said medium, a scale or dial, an indicator combined with said movable member in such a manner that it moves over said scale when said member moves, and means for causing said scale to move in a direction at approximately right angles to the path of movement of said indicator when the pressure in said passageway varies.

2. A meter for the purpose described, comprising a chamber or passageway, a freely movable member in said passageway whose position is governed by the velocity of the medium that passes through said passageway, said member being so designed and arranged that variations in the pressure of said medium will not result in a change in the position of said member, a movable indicator whose position is governed by said member, a dial or scale that coöperates with said indicator and provided with separate and distinct marks that represent pressure and volume of the medium being metered, and a pressure-operated device governed by the pressure of the medium in said passageway for causing said dial to move in a direction at approximately right angles to the path of movement of said indicator when the pressure of the medium in said passageway varies.

3. A meter for the purpose described, comprising a chamber or passageway through which the medium to be metered travels, a movable member arranged in said passageway, means that holds said member in a certain position in said passageway when no medium is traveling through said passageway, irrespective of the pressure in said passageway, a visual indicating means that coöperates with said member to indicate the quantity of the medium that travels through said passageway in a given time, said visual indicating means comprising an indicator controlled by said movable member, a movable dial or scale that coöperates with said indicator, and a device governed by the pressure in said passageway for controlling the position of said dial and causing it to move in a direction at approximately right angles to the path of movement of said indicator when the pressure in said passageway varies.

4. A meter for the purpose described, comprising a chamber or passageway, a substantially bell-shaped member arranged in said passageway with its concave portion presented toward the medium that flows through said passageway, swinging links that support said member, a dial or graduated scale, a coöperating indicator whose position changes automatically whenever the member in said passageway moves, a resilient means combined with said indicator for holding it at a certain point on said scale, and means for varying the tension of said resilient means.

In testimony whereof I hereunto affix my signature in the presence of two witnesses, this twenty-fifth day of October 1915.

GEORGE D. POGUE.

Witnesses:
WELLS L. CHURCH,
GEORGE BAKEWELL.